No. 654,712. Patented July 31, 1900.
A. CERRUTI.
DOMESTIC BOILER.
(Application filed Apr. 16, 1900.)
(No Model.)
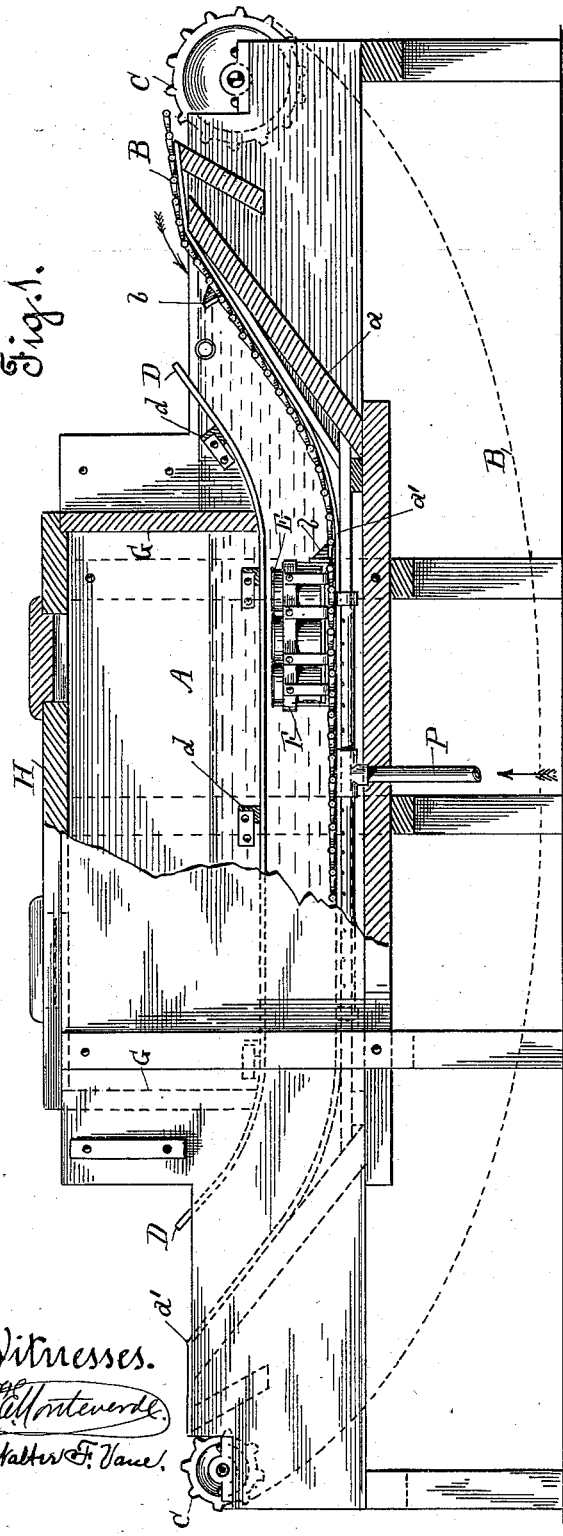
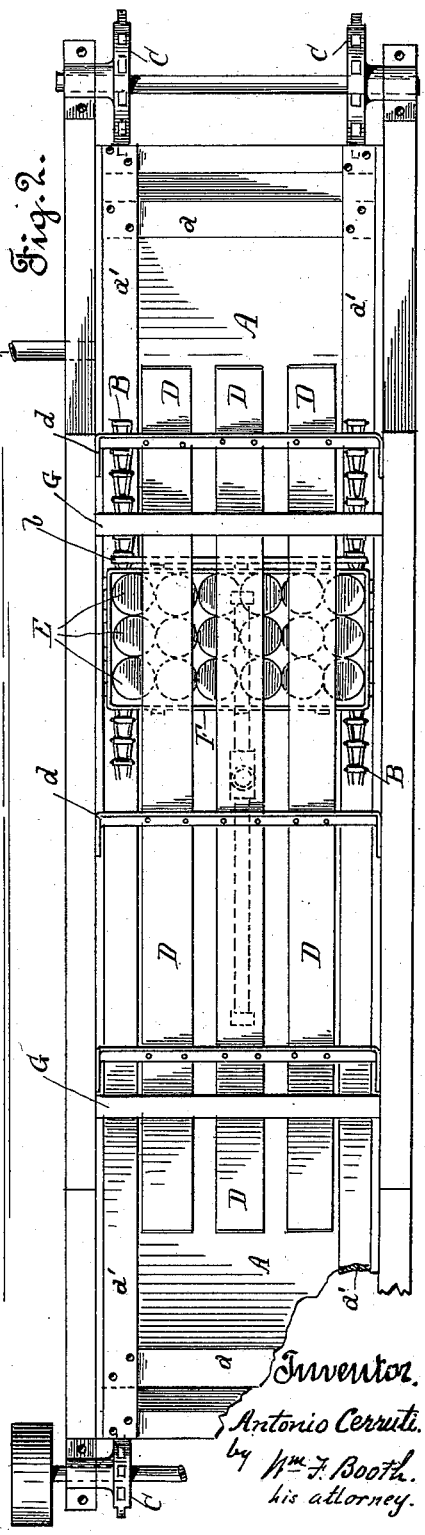
Witnesses.
J. E. Monteverde.
Walter F. Vance.
Inventor.
Antonio Cerruti.
by Wm. F. Booth.
his attorney.
THE NORRIS PETERS CO., PHOTO-LITHO., WASHINGTON, D. C.

UNITED STATES PATENT OFFICE.

ANTONIO CERRUTI, OF SAN FRANCISCO, CALIFORNIA.

DOMESTIC BOILER.

SPECIFICATION forming part of Letters Patent No. 654,712, dated July 31, 1900.

Application filed April 16, 1900. Serial No. 13,050. (No model.)

*To all whom it may concern:*

Be it known that I, ANTONIO CERRUTI, a citizen of the United States, residing at the city and county of San Francisco, in the State of California, have invented certain new and useful Improvements in Cooking-Machines; and I do hereby declare the following to be a full, clear, and exact description of the same.

My invention relates to that class of machines for cooking fruit, vegetables, &c., in cans in which the can-laden trays are conveyed through the water by an endless traveling carrier.

My invention consists in the novel constructions and combinations of the parts of the machine which I shall hereinafter fully describe and claim and by which I attain the objects of providing for a steam-trap above the cooking-water, of securing a simple, convenient, and effective construction of trough adapted to readily receive, guide, and discharge the trays and their contents, and directing and conducting a suitable and effective traveling carrier through the trough.

Referring to the accompanying drawings, Figure 1 is a side view, partly in section, of my cooking-machine. Fig. 2 is a top view, the lid H being removed.

A is the trough, consisting of a suitable vessel adapted to contain water. The ends $a$ of this trough are slopingly or flaringly upturned, as shown in Fig. 1, in order to facilitate the entrance and exit of the traveling tray-carrier. This carrier consists of side chains B, to which at intervals are secured the cross-flights $b$. Within the trough on each side of its bottom and sloping ends are suitable rails $a'$, consisting of flat pieces, upon which the endless side chains of the carrier drag in passing through the trough, thereby avoiding undue wear. The carrier-chains B pass over suitable terminal sprockets C, and the carrier is driven by suitable mechanism, unnecessary herein to show. The course of the carrier is down over the sloping end $a$ into the trough, and by its own weight and that of the can-laden trays upon it it keeps along the bottom, thence up the other sloping end, and down around under the trough to the beginning.

To suitable cross-braces $d$ in the trough are secured the guide-plates D. These may be in any number, but I have here shown three. They are separated, as shown, and extend longitudinally of the trough and are located at such a distance above the bottom of the trough as to permit the cans E upon the trays F, placed on the carrier, to pass under them. Their function is to prevent the cans from rising from their trays as they pass through the water in the trough. Being separated these guide-plates do not interfere with the free circulation of the water, and yet they serve as guides to hold the cans down.

G are cross-partitions, one near each end of the trough-bottom, but sufficiently removed therefrom to leave said ends free and exposed to permit the trays to be placed on the carrier and to be removed therefrom. They terminate short of the bottom, ending in practice at the guide-plates D and below the level of the water, as shown. In connection with a lid H, placed upon these partitions, the latter, together with the water, form a cover device or trap to provide an inclosed space or chamber above the water and in which the steam is confined.

The operation of the machine is as follows: Water being supplied to the trough A, steam is furnished thereto through pipe P, and said steam instead of escaping directly is confined by the cover device in the space or trap inclosed by the water-level, the partition G and the lid H thus securing its best heat efficiency. The attendant places the can-laden trays upon the traveling carrier between its flights, and said trays are carried down into and through the water in the trough, the cans being guided under plates D. After the contents of the cans are cooked and as the trays appear at and rise upon the other sloping end of the trough the attendant removes them.

Having thus described my invention, what I claim as new, and desire to secure by Letters Patent, is—

1. A cooking-machine comprising a suitable trough, a traveling carrier, mounted and adapted to travel through the water in said trough, and to receive and convey the can-laden trays therethrough, and a cover or box device above said trough and extending down below the water-level therein, whereby a chamber or trap is formed above the water, for confining the steam.

2. A cooking-machine comprising a suitable trough, a traveling carrier, mounted and adapted to travel through the water in said trough, and to receive and convey the can-laden trays therethrough, cross-partitions above the trough and extending down therein below the water-level, but terminating short of its bottom, and a lid on said partitions, whereby a steam space or trap is formed in the trough, above the water.

3. A cooking-machine comprising a trough, having upturned sloping ends, a traveling carrier adapted to pass down and up said ends and along the trough-bottom, and to receive and convey the can-laden trays through said trough, a cover or box device short of said sloping ends, leaving them free and exposed, to receive and to discharge the trays, said cover or box device extending down below the water-level in the trough, whereby a chamber or trap is formed above the water, for the steam.

4. A cooking-machine comprising a trough, having upturned sloping ends, a traveling carrier adapted to pass down and up said ends and along the trough-bottom, and to receive and convey the can-laden trays through said trough, cross-partitions in the trough, separated far enough from the sloping ends, to leave the latter free and exposed, to receive and discharge the trays, said partitions extending down into the trough below the water-level therein, but terminating short of its bottom, and a lid on said partitions, whereby a steam space or trap is formed in the trough above the water.

5. A cooking-machine, comprising a trough, fixed guide-plates therein, above its bottom, and a traveling carrier mounted and adapted to travel through the water in said trough, below the fixed guide-plates and to receive and convey the can-laden trays through the trough, with the tops of said cans below the fixed guide-plates, whereby they are held down in their trays.

6. A cooking-machine, comprising a trough, fixed guide-plates therein, above its bottom, and a traveling carrier mounted and adapted to travel through the water in said trough, below the fixed guide-plates and to receive and convey the can-laden trays through the trough, with the tops of said cans below the fixed guide-plates whereby they are held down in their trays, and a cover or box device extending down below the water-level in the trough, to form a steam space or trap above the water, said cover device consisting of cross-partitions extending down to below the level of the water in the trough, and a lid upon said partitions.

7. A cooking-machine comprising a trough, having upturned sloping ends, a traveling carrier adapted to pass down and up said ends and along the trough-bottom, and to receive and convey the can-laden trays through the trough, fixed separated guide-plates within the trough and located high enough above its bottom and ends to allow the cans to pass under them, said plates being adapted to hold said cans down in their trays while passing through the water, cross-partitions in the trough, separated far enough from the sloping ends, to leave the latter free and exposed, to receive and discharge the trays, said partitions extending down into the trough below the water-level therein, but terminating short of its bottom, and a lid on said partitions, whereby a steam space or trap is formed in the trough above the water.

8. A cooking-machine comprising a trough having sloping ends, wearing-rails upon each side of the bottom of both trough and ends, a traveling carrier passing over and upon said rails, and adapted to receive and convey the can-laden trays through the trough, fixed separated guide-plates within the trough and located high enough above its bottom and ends to allow the cans to pass under them, said plates being adapted to hold said cans down in their trays while passing through the water, cross-partitions in the trough, separated far enough from the sloping ends, to leave the latter free and exposed, to receive and discharge the trays, said partitions extending down into the trough below the water-level therein, but terminating short of its bottom, and a lid on said partitions, whereby a steam space or trap is formed in the trough above the water.

In witness whereof I have hereunto set my hand.

ANTONIO CERRUTI.

Witnesses:
 PHILIP BUSH,
 A. N. CUDWORTH.